UNITED STATES PATENT OFFICE.

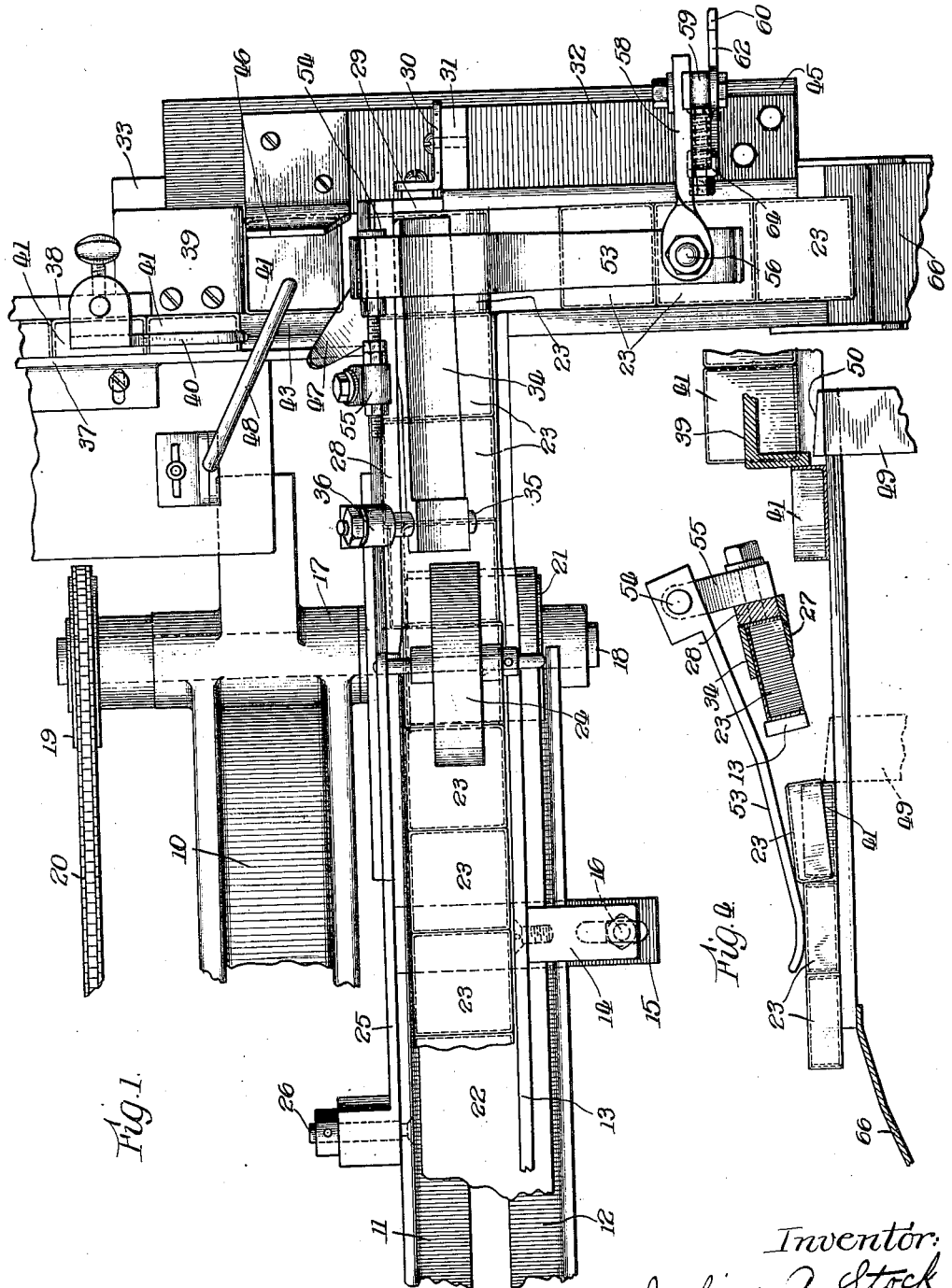

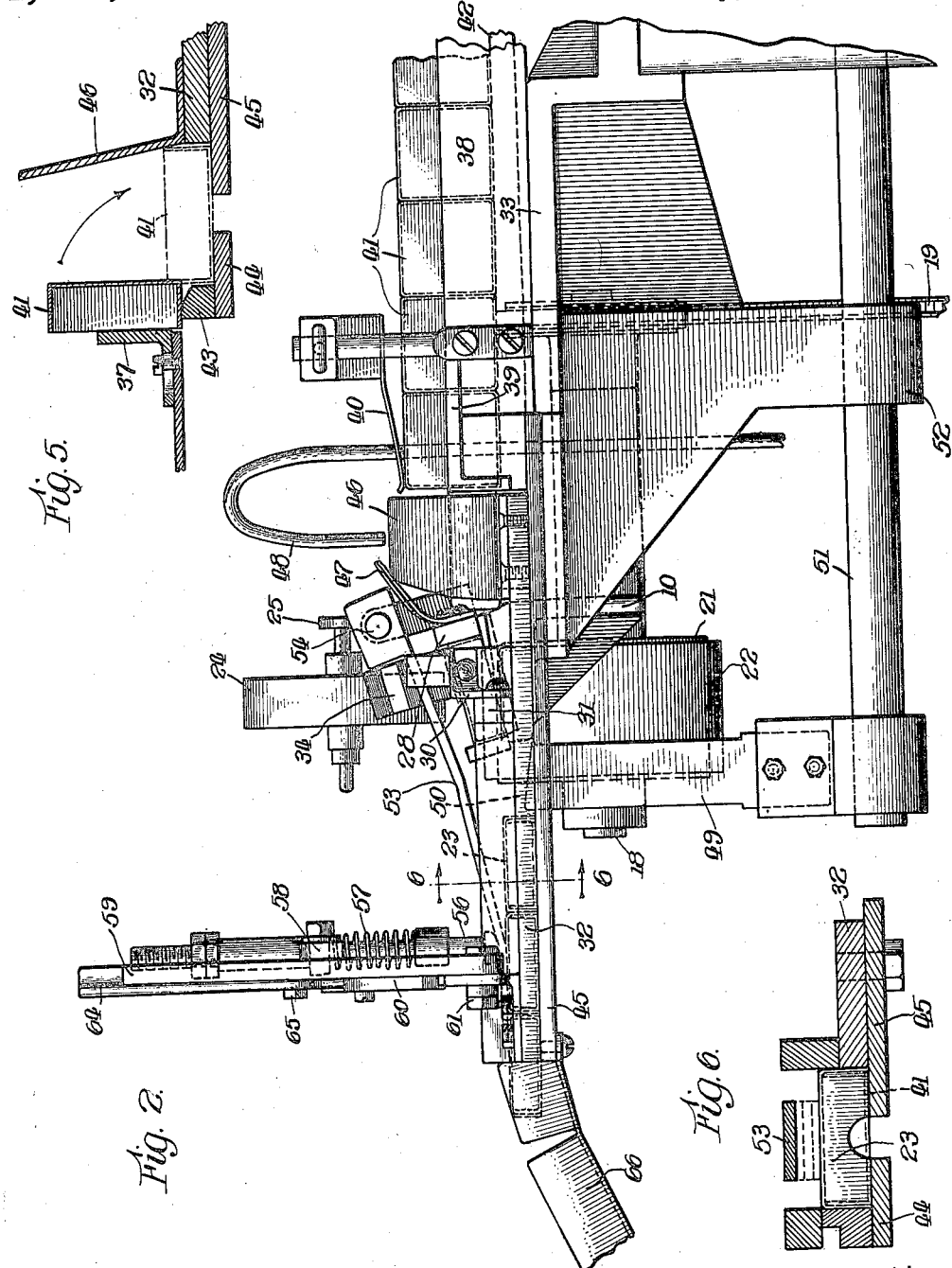

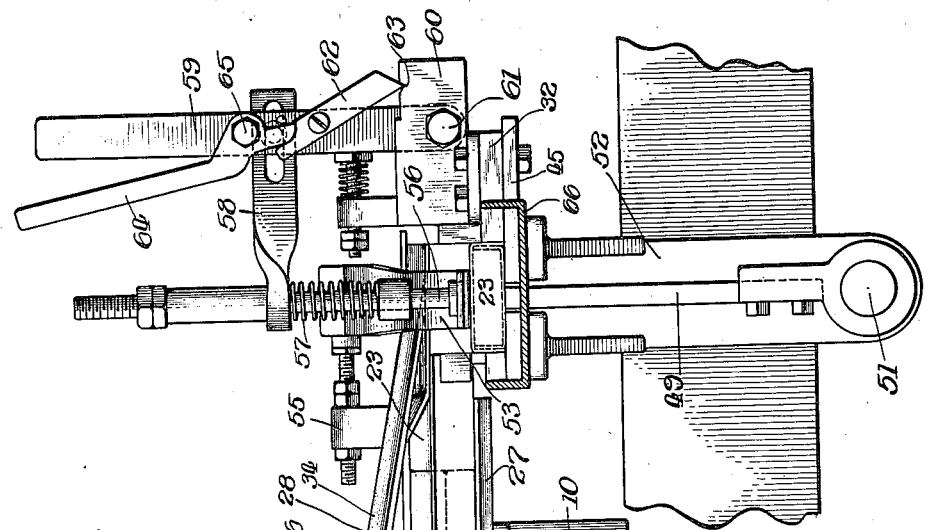

JULIUS A. STOCK, OF CICERO, ILLINOIS, ASSIGNOR TO W. C. RITCHIE & COMPANY, OF CHICAGO, ILLINOIS, A CORPORATION OF ILLINOIS.

BOX-CLOSING APPLIANCE.

1,419,590.  Specification of Letters Patent.  Patented June 13, 1922.

Application filed June 21, 1920. Serial No. 390,339.

*To all whom it may concern:*

Be it known that I, JULIUS A. STOCK, a citizen of the United States, residing at Cicero, in the county of Cook and State of Illinois, have invented certain new and useful Improvements in Box-Closing Appliances, of which the following is a specification.

My invention concerns devices for assembling the parts of pasteboard and similar boxes such as so-called trays or box bodies and the flanged covers therefor. In the present instance such trays or rectangular box bodies, comprising bottom, side, and end walls, with open tops or mouths are made automatically on suitable machines and the covers are similarly produced on other adjacent appliances. By a device forming the subject matter of this application such covers and trays are brought into registered position and assembled or telescoped over one another, or in the terms of the trade the machine automatically closes the boxes by the application of the covers thereto.

It is an aim of this invention to provide a machine for performing this work which comprises a few parts of simple structure and which is, therefore, relatively inexpensive to manufacture, and which will effect the assembling operation of the box elements with accuracy, dispatch, and effectiveness.

To enable those skilled in this art to understand the construction and mode of operation of an appliance embodying this invention, I have illustrated a desirable embodiment of the same in the accompanying drawings forming a part of this specification, and throughout the several views of which like reference characters refer to the same parts.

In these drawings

Figure 1 is a fragmentary plan view of the machine;

Figure 2 is an end elevation of the same;

Figure 3 is a front elevation of the appliance;

Figure 4 is a vertical section illustrating the manner of assembling the covers and trays;

Figure 5 is a section depicting the manner in which the box bodies or trays fall over open mouth up;

Figure 6 is an enlarged cross-section on line 6—6 of Figure 2; and

Figure 7 is a cross-section through the cover conveyer mechanism.

Referring to these drawings it will be seen that the appliance includes a supporting bracket-arm 10 of irregular shape which supports two, parallel, spaced angle-bars 11 and 12 with horizontal flanges facing one another and each having its other flange disposed vertically. Between such upright flanges and adjacent to the bar 12 a long, slightly-bent, substantially-horizontal guide-bar 13 is employed, being mounted on a plurality of blocks 14, of which only one is shown in the drawings, adjustably supported by bolt and slot connections 16 on transverse bars 15 fastened to the under sides of the parallel angle-bars 11 and 12. Thus the vertical flange of the bar 11 and the parallel member 13 constitute spaced guides between which the flanged box-covers 23 are adapted to pass, being advanced by mechanism about to be described.

The supporting-bracket 10 has a bearing 17 accommodating a rotary shaft 18 revolved by means of a sprocket-wheel 19 fastened to its rear protruding end and rotated by a sprocket-chain 20 driven from any suitable source of power, not shown. Shaft 18 beneath the ends of the bars 11 and 12, which may be cut away at their lower portions at such ends if desired, is supplied with a drum 21 around which an endless conveyer or belt 22 passes, the upper stretch of such belt resting and traveling on the spaced horizontal flanges of the bars 11 and 12 and beneath the guide-bar 13, whose lower edge is somewhat above the top surface of the horizontal flange of bar 12 to permit such accommodation and passage of the belt beneath it.

As is clearly illustrated, the box-covers 23 rest upon the belt 22 mouth downward and are advanced thereby in the usual manner, being held down on the top surface of the belt by a roller 24 revoluble on a shaft carried by an arm 25 hinged or fulcrumed on a pin 26 fastened in the upright flange of bar 11, the weight of arm 25 and the wheel being adequate to hold the box-covers on the belt with pressure sufficient to effect their proper feeding as the belt travels.

Also mounted on the bracket 10 just beyond the endless belt 22 is a cover-supporting plate 27 inclined transversely of the direction of travel of the box-covers and at its right-hand part cut away so as to extend only part way under the covers as is clearly shown in Figure 4. Along the rear edge of such plate is a longitudinal guide-bar 28, and at the right-hand end of the elements 27 and 28, as the parts are viewed in Figure 1, an abutment or stop 29 is employed, being mounted on an angle-bracket 30 adjustably supported on a block 31 upstanding from a plate 32. The endmost box-cover 23 resting in inclined relation on the plate 27, as illustrated in Figure 4, is adapted to bear against the abutment 39, the travel of belt 22 being somewhat faster than the speed of removal of the covers so that the latter are maintained in abutting relation as indicated in the several figures.

In order to prevent the one or more covers from falling off of the reduced width portion of the plate 27, a bar or plate 34 is positioned above such box-elements, being hinged on a rod or shaft 35 carried by a bracket 36 mounted on bar 28. The weight of this member 34 is sufficient to maintain the endmost box in proper position as is shown in Figure 4.

The box-trays or box-bodies are fed edgewise into the appliance step by step through a chute or passage formed by a suitable bottom-wall and side-guides 37 and 38, the latter being supplemented by an angle-bar 39, Figures 1 and 2, which forms an extension of the chute or passage element 38. To hold such box-bodies or box-trays edgewise down on the bottom-wall of the passage, a suitably mounted leaf-spring 40 is employed to ride and press on their top surfaces. Such bottom wall terminates practically in register with the downturned flange of the angle-member 39 but the bar 37 extends forwardly beyond this point and a beveled bar 43 is employed on which the bottom edges of the box-bodies ride. When the foremost box-tray has been pushed by the oncoming box-trays on the element 43 beyond the angle-bar member 39 it falls over open mouth up, as shown in Figure 5, because of the beveled or cut away character of such support, an inclined guide-plate 46 fastened to the plate 32, and a warped or twisted guide-plate 47 fastened to the supporting-bar 28 directing or assisting in such overturning movement. To assure such falling of the box-body, an air-pipe 48 is employed from which a blast of compressed-air issues tending to blow the box-trays over into the horizontal dotted line position of Figure 5, one of the boxes in such position being shown in full lines in Figure 1. It will be seen, therefore, that whereas the boxes are fed edgewise to this appliance, they are turned over in succession ready for assembly in sequence with the corresponding inclined covers held in the position depicted in Figure 4.

Such fallen, horizontal box-tray just in front of the angle-member 39 is acted upon by a reciprocatory feeder or pusher 49 having an enlarged head with a beveled top face 50, the feeder being adapted to reciprocate in the slot or space between the box-supporting plates 44 and 45 and being mounted on a sliding shaft 51 reciprocated in a bearing 52 by any desired means, not shown. When such pusher travels to the right as the parts are viewed in Figure 4, it slides under the box body or tray just in front of the member 39, temporarily or momentarily lifting such box element and passing beneath it and the down-turned flange of part 39, as is fully illustrated, to assume a position back of the box-tray. Then as the pusher 49 travels to the left, it engages the rear face of the box-tray and carries the latter along the supporting plates 44 and 45 between suitable guides and the front part of the tray becomes interlocked with the foremost inclined cover 23 which is bearing against the stop 29 and removes such cover from its support, so that the cover and tray are partially assembled or telescoped as shown in Figure 4.

To complete the assembly a bent bar 53 is rockingly mounted on a stationary shaft or pin 54 supported in a bracket 55 fastened to and upstanding from the bar 28. To apply a suitable pressure to the element 53, a plunger 56 is positioned above it and bears on its face, such plunger being pressed downwardly by a coil-spring 57 surrounding it, these parts being mounted on a right-angle arm 58 having a handle 59 and fulcrumed on a suitable support 60 at 61, such arm being held in operative position by a catch or dog 62 adapted to engage a notch 63 in element 60 and releasable by a supplemental handle 64 pivoted on the main handle 59 at 65. The assembled box bodies and covers are discharged down a runway 66 as they pass out from beneath the bar 53 at intervals as occasioned by the reciprocation of feeder 49, which not only effects the partial unison or association of the box tray and cover but also advances the other assembled box elements in front thereof.

Thus the two sets of box elements, trays and covers, come to this assembling appliance from machines which automatically manufacture them, but which have not been illustrated, and they are united or telescoped the one over the other in the manner indicated above, it being obvious that if for any reason the supply of box-bodies is interrupted none of the box-covers will be removed because the dislodgment of the foremost one depends upon the presence of a box-tray over which it may be automatically fitted.

The invention is not limited and restricted to the precise and exact features of structure illustrated and described because these may be changed within comparatively wide limits without departure from the substance and essence of the invention and without sacrificing any of its material benefits and advantages.

I claim:

1. In a box-assembling machine of the character described, the combination of two substantially horizontal conveyers arranged at approximately right-angles to one another and at different levels, the upper one of said conveyers designed to feed box-covers individually in succession in tilted relation over the path of travel of box-trays fed by the other conveyer whereby the trays become interlocked with the covers, and means to force the covers down over the trays as they advance in partially assembled relation, substantially as described.

2. In a box-assembling machine, of the character described, the combination of a support for a box-cover, an abutment against which the cover on said support may bear, an endless conveyer adapted to feed a row of said covers with the advance one on said support and against said abutment and at a rate faster than the removal of the covers from said support, a conveyer for box-trays beneath said foremost cover operative at substantially right angles to said cover conveyer, said support being inclined to the path of travel of the box trays whereby the latter as they advance become interlocked with the tilted covers and remove them from the support, and means to force the covers over said trays, substantially as described.

3. In a box-assembling machine of the character described, a support for a box-cover, an abutment against which the cover on said support may bear, a conveyer adapted to feed a row of said covers with the advance ones on said support and against said abutment and at a rate faster than the removal of the covers from said support, said support being inclined transversely to the direction of travel of said conveyer, a conveyer for box-trays beneath said foremost cover operative at substantially right angles to said cover conveyer, said support being inclined to the path of travel of the box-trays whereby the latter as they advance become interlocked with the tilted covers and remove them from the support, and means to force the covers over said trays, substantially as described.

4. In a box-assembling machine of the character described, the combination of a support for and beneath a portion only of a box-cover, means to hold the cover on said support, an abutment against which the cover on said support may bear, an endless conveyer adapted to feed a row of said covers with the advance one on said support and against said abutment and at a rate faster than the removal of the covers from said support, said support being inclined transversely to the direction of travel of said conveyer, a conveyer for box-trays beneath said foremost cover operative at substantially right angles to said cover conveyer, said support being inclined to the path of travel of the box-trays whereby the latter as they advance become interlocked with the tilted covers and remove them from the support, and means to force the covers fully home over said trays, substantially as described.

5. In a box-assembling machine of the character described, the combination of a support for and beneath a portion only of a box-cover, means to hold the cover on said support, an abutment against which the cover on said support may bear, an endless conveyer adapted to feed a row of said covers with the advance one on said support and against said abutment and at a rate faster than the removal of the covers from said support, said support being inclined transversely to the direction of travel of said conveyer, a conveyer to feed box-trays edgewise, means to cause the trays to fall over open mouth up, means to advance the over-turned trays whereby each engages and becomes partially assembled with one of said covers, and means to force the covers fully home over the trays during their further travel, substantially as described.

JULIUS A. STOCK.